(12) United States Patent
Agashe

(10) Patent No.: US 8,727,545 B2
(45) Date of Patent: May 20, 2014

(54) METHOD FOR CONTROLLING RETROREFLECTIVITY BY APPLICATION OF OPAQUE AND TRANSMISSIVE AGENTS TO A RETROREFLECTIVE FILM AND SHEETING PRODUCED THEREBY

(75) Inventor: Nikhil Agashe, Chicago, IL (US)

(73) Assignee: Avery Dennison Corporation, Glendale, CA (US)

(*) Notice: Subject to any disclaimer, the term of this patent is extended or adjusted under 35 U.S.C. 154(b) by 180 days.

(21) Appl. No.: 13/351,272

(22) Filed: Jan. 17, 2012

(65) Prior Publication Data

US 2012/0188641 A1 Jul. 26, 2012

Related U.S. Application Data

(60) Provisional application No. 61/435,860, filed on Jan. 25, 2011.

(51) Int. Cl.
G02B 5/128 (2006.01)
(52) U.S. Cl.
USPC .......................................... 359/536
(58) Field of Classification Search
USPC ................... 359/529, 530; 428/172
See application file for complete search history.

(56) References Cited

U.S. PATENT DOCUMENTS 7,396,579 B2 * 7/2008 Owusu .......................... 359/529
2002/0086143 A1 7/2002 Tanaka et al.

FOREIGN PATENT DOCUMENTS

WO 99/37470 7/1999

OTHER PUBLICATIONS

International Search Report dated Jul. 4, 2012 for International Application No. PCT/US2012/021480 filed Jan. 17, 2012.
Written Opinion dated Jul. 4, 2012 for International Application No. PCT/US2012/021480 filed Jan. 17, 2012.
"Guide to Retroreflection Safety Principles and Retroreflective Measurements", Richard L. Austin, et al., Jan. 1, 2009.

* cited by examiner

Primary Examiner — Euncha Cherry
(74) Attorney, Agent, or Firm — Avery Dennison Corporation

(57) ABSTRACT

A retroreflective sheet, which may be a beaded retroreflective sheet or a prismatic retroreflective sheet, is comprised of a substrate having a first and second surfaces with a plurality of retroreflective elements disposed on the second surface of the substrate to form the retroreflective sheet having an initial performance standard and a printed pattern disposed on the second surface, the pattern provided in an amount ranging from 30% to about 100% of an area of the second surface to change a performance level of the retroreflective sheet from the initial performance standard to a selected performance standard. A method for producing the retroreflective sheeting and a system for controlling the retroreflectivity of the retroreflective sheeting by altering a surface of the retroreflective sheeting is provided.

20 Claims, 5 Drawing Sheets

METHOD FOR CONTROLLING RETROREFLECTIVITY BY APPLICATION OF OPAQUE AND TRANSMISSIVE AGENTS TO A RETROREFLECTIVE FILM AND SHEETING PRODUCED THEREBY

CROSS-REFERENCE TO RELATED APPLICATION

The present application claims priority from U.S. Provisional Application No. 61/435,860 filed Jan. 25, 2011, which is incorporated by herein by reference in its entirety.

FIELD OF THE INVENTION

The present invention is found in the field of retroreflective material and more particularly in controlling or manipulating the performance of retroreflective sheeting, or film, to meet a particular performance standard.

BACKGROUND OF THE INVENTION

Materials that have retroreflective microcubes formed thereon or glass beads deposited thereon possess a property that incident light is reflected back in a direction from which it originates. This makes the materials popular for use in a wide range of products that require a retroreflective attribute. The materials are particularly useful for safety applications reasons, including signage, construction barriers, traffic barriers, personal protection gear and the like.

There are two different ways to make materials retroreflective. One method uses microscopic beads to form what is generally referred to as "beaded sheets." The microscopic beads may have a metallized coating to improve performance and the microscopic beads may be deposited on a surface of sheeting, or film, or be partially or fully embedded in the sheeting. The second method uses microprisms, commonly referred to as prismatic sheeting. Prismatic sheeting uses cube-cornered, triangles, hexagons, squares and rectangles to bounce back reflected light.

Generally, the prismatic sheeting is brighter than beaded sheeting. In terms of interchangeability of beaded sheeting and prismatic sheeting, it would be very difficult to make the prismatic sheeting perform just like the beaded sheeting. Likewise, it would be impossible to make the beaded sheeting perform just like the prismatic sheeting.

A highway sign made with beaded sheeting could be replaced by a second sign with prismatic sheeting, but there would be a difference since the prismatic sheeting would be a little brighter during both day and night. Sometimes highway signs are made with beaded sheeting for a sign background, while the prismatic sheeting is used for cutout letters. However, beaded sheeting and prismatic sheeting are not combined as materials for the sign background, and it is rare to use a mixture of beaded sheeting letters and prismatic sheeting letters. At certain angles, differences in the beaded sheeting and prismatic sheeting would be quite noticeable and could cause confusion.

In a retroreflective field, a standard applied to retroreflective sheeting is decided by specifications set by road management authorities, such as the Federal Highway Administration (FHWA), Department of Transportation (DOT), etc. In addition, standards set forth by the American Society for Testing and Materials (ASTM) are also taken into consideration. ASTM is an international standards organization that develops technical standards for a wide range of products and materials. The specifications are mainly based on retroreflective performance, which is an amount of retroreflected light that is returned from retroreflective sheeting.

Retroreflective sheeting is manufactured to pass these specifications, and typically, manufactured retroreflective sheeting has values much higher than the specifications or standards. The sheeting is then processed to make roadside traffic signs for highways, city roads or used in other safety applications such as vests, cones or barriers.

The performance of the retroreflective sheeting degrades due to natural elements such as sunlight, ultraviolet light, heat and dust. In addition, retroreflective sheeting degrades from poor maintenance during use. Over its lifetime, retroreflectivity of the retroreflective sheeting may be reduced. As performance diminishes, it is important for road authorities and safety inspectors to inspect signs and safety devices as well as compare the retroreflective sheeting with relevant specifications or standards to ensure that the retroreflective sheeting is still functional and safe.

A most accurate way for an inspection is through the use of a hand-held retro reflectometer, which reads the sign and displays the value of specific intensity per unit (SIA). This method is both time consuming and expensive.

Hence this inspection is almost always done visually by comparing the sign or safety device with the relevant specification or standard. The main challenge is to make available a standard which will accurately match the specifications.

What is needed therefore is a method by which to better control and improve the performance of both beaded and prismatic sheeting without the need to mix different types of reflective materials and to provide retroreflective sheeting that can be changed or manipulated in order to routinely meet the relevant specification or standard that has been selected.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Retroreflective sheeting is commonly comprised of glass beaded material or cube-corner prismatic elements to reflect light back to its source. An amount of retroreflected light, light reflected back to its source, depends on a variety of factors. For example, glass beaded material may be dependent on a type of glass beads and a refractive index of glass beads.

It is an object of the present invention to provide a retroreflective sheet having a substrate with a first surface and a second surface with a plurality of retroreflective elements disposed on the second surface of the substrate to form the retroreflective sheeting. The sheeting has or meets an initial performance standard and a printed pattern disposed on the second surface. The pattern is provided in an amount ranging from 30% to about 100% of an area of the second surface to change a performance standard of the retroreflective sheeting from the initial performance standard to a particular performance standard.

It is yet another object of the present invention to provide a method for producing a retroreflective sheeting, the method comprising the steps of providing a supply of material, with the material having a first and second surface and a plurality of retroreflective elements provided on the second surface of the material to form retroreflective sheeting. The retroreflective sheeting having an initial performance standard. Next, determining a retroreflectivity standard; and finally manipulating the retroreflective sheeting to change the retroreflective sheeting from the initial performance standard to a modified performance standard that is different than the initial performance standard to match a particular performance standard.

In addition, the method may also include a further step of comparing a manipulated retroreflective sheeting to the particular performance standard as well as the further step of changing the retroreflective sheeting after the step of comparing the manipulated retroreflective sheeting to meet the particular performance standard.

It is yet another object of the present invention to provide a system for controlling retroreflectivity in retroreflective sheeting, the system comprising a supply of retroreflective sheeting having an initial performance standard, a first data set having a plurality of retroreflective performance standards, a second data set containing a plurality of patterns and overlay combinations used for manipulating the supply of retroreflective sheeting to provide for a modified performance standard, a distribution request setting forth a particular retroreflective performance standard contained within the first data set, a manufacturing module for using at least one of the plurality of patterns and overlay combinations to change the initial performance standard of the supply of retroreflective sheeting to a particular performance standard set forth in the distribution request, and a measurement tool for measuring the modified performance standard of the supply of retroreflective sheeting to the particular performance standard of the distribution request after utilizing the second data set to manipulate the supply of retroreflective sheeting.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Retroreflective sheeting may include beaded retroreflective sheeting and prismatic retroreflective sheeting. Beaded retroreflective sheeting is composed of microscopic beads, or microbeads, that have a metalized coating, while prismatic retroreflective sheeting utilizes cube-cornered geometry to retroreflect light.

Figure 1:
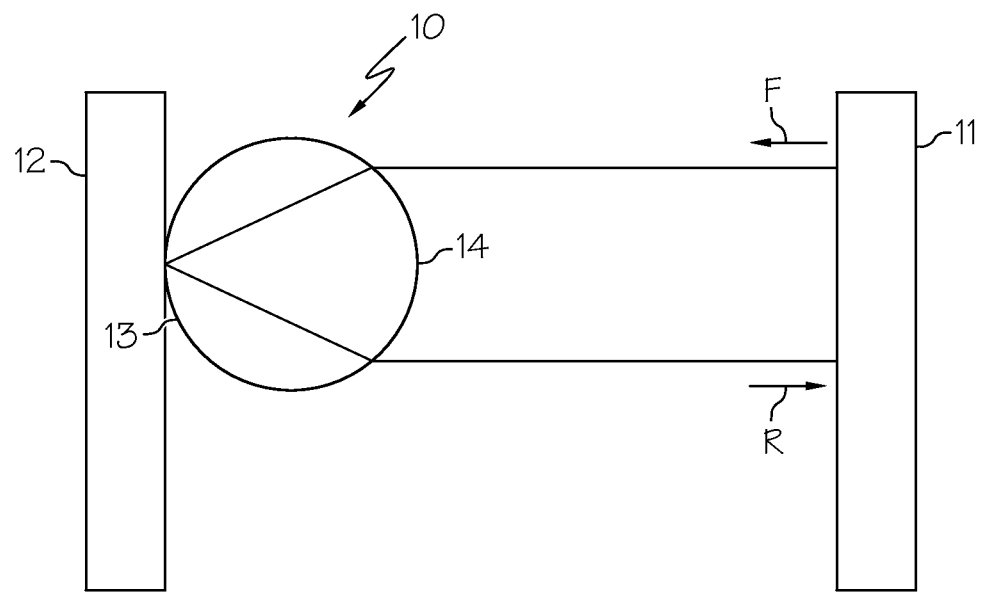
FIG. 1 depicts a reflected light path for a microbead.

With reference to FIG. 1, a light pattern for a microbead 10 is shown. A light source 11 directs light to a front surface 14 of the microbead 10. The light enters the front surface 14 of the microbead 10, as indicated by arrow F. The front surface 14 refracts the light to a back surface 13 of the microbead 10. The back surface 13 is abutted against a mirror 12, which retroreflects the light to the light source 11 as indicated by arrow R.

Figure 2:
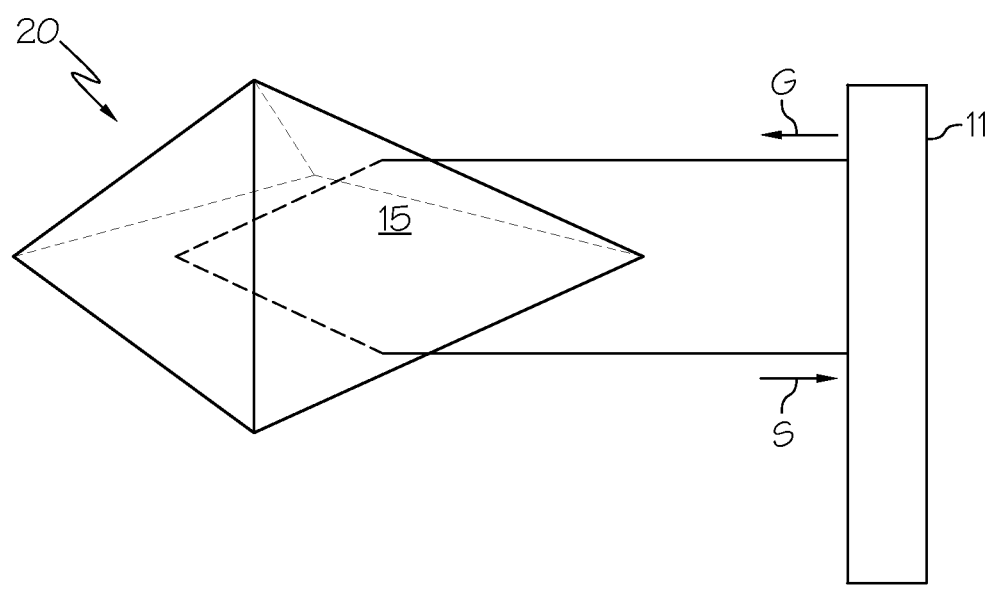
FIG. 2 shows a reflected light path for a microprism.

With reference to FIG. 2, a reflection pattern for a microprism, or cube-corner, 20 is shown. The light source 11 directs light to a front side 15 of the microprism 20, as indicated by arrow G. The front side 15 of the microprism 20 refracts the light within the microprism 20. The light is later retroreflected back through the front side 15 of the microprism 20 to the light source 11, as indicated by arrow S.

For prismatic retroreflective sheeting, there are several factors that influence performance, such as shape and size of a prism and a refractive index. In addition, sheeting performance is also affected by a type of material used in construction or manufacture as well as its transmissive capability. For example, certain acrylic materials exhibit excellent clarity as opposed to polyester-based materials used in reflective sheeting.

Figure 3A:
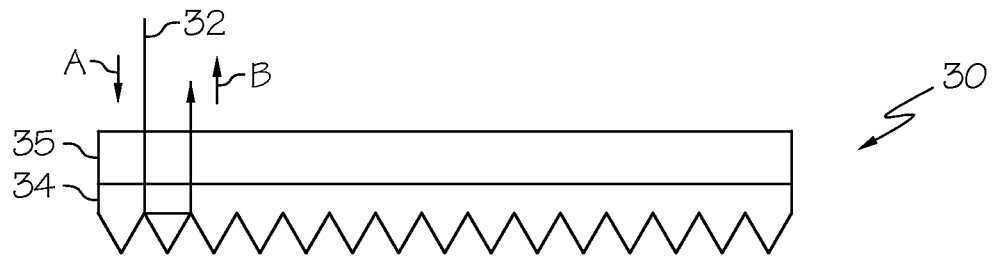
FIG. 3A provides a retroreflective film showing retroreflected light pattern in an exemplary prismatic film.

An example of a standard prismatic retroreflective sheeting, or film, 30 is shown in FIG. 3A. The standard prismatic retroreflective sheeting 30 is composed of a cover layer 35 and a microprism layer 34. A light path 32 enters through the cover layer 35, which is designated by arrow A, and enters into the microprism layer 34. While the light path 32 is in the microprism layer 34, the light path 32 is reflected back by the microprism layer 34. As indicated by arrow B, the light path 32 is retroreflected from the standard prismatic retroreflective sheeting 30.

Figure 3B:
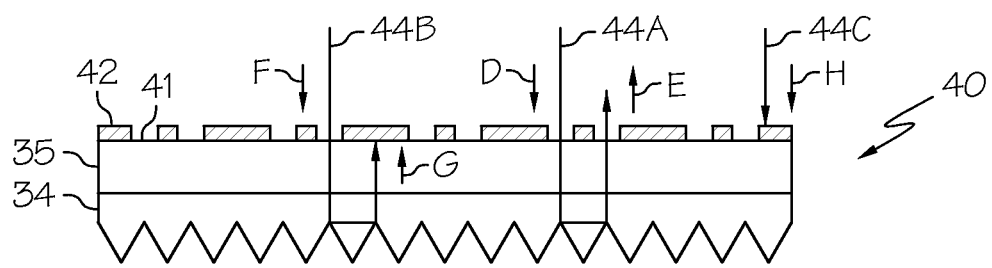
FIG. 3B provides the film of FIG. 3A with a printed or imaged pattern disposed on the surface of the film and showing the alteration of the light pattern.

In FIG. 3B, a retroreflective sheet 40 with an ink layer 42 is shown. The retroreflective sheet 40 is composed of the cover layer 35 and the microprism layer 34. The ink layer 42, which may serve as one type of overlay, is deposited on a top surface 41 of the retroreflective sheet 40. The ink layer 42 could be transmissive, partially transmissive or opaque in nature. A printed pattern of the ink layer 42 can be printed manually, screen-printing, or digitally by an ink-jet or thermal transfer ribbon. Coverage of the ink layer 42 can be between 1% to about 100% (partial to full coverage) with about 30% to about 100% being preferred. Optimally, the ink layer 42 may have coverage between 50% to about 100%. The printed pattern as well as a type of ink used may partially or completely block light.

FIG. 3B provides for three embodiments. In the first embodiment, a first light path 44A enters into the cover layer 35, which is shown by arrow D, and retroreflected out of the microprism layer 34, as indicated by arrow E. A second embodiment displays a second light path 44B that enters into the cover layer 35 as indicated by arrow F. The second light path 44B is reflected off of the microprism layer 34, but cannot exit out of the reflective sheet 40 because the second light path 44B is blocked by the ink layer 42, which is indicated by arrow G. As a result, the second light path 44B is absorbed by the reflective sheet 40. The last embodiment demonstrates a third light path 44C that cannot enter through the cover layer 35 because the ink layer 42 is blocking the third light path 44C as indicated by arrow H.

Figure 3C:
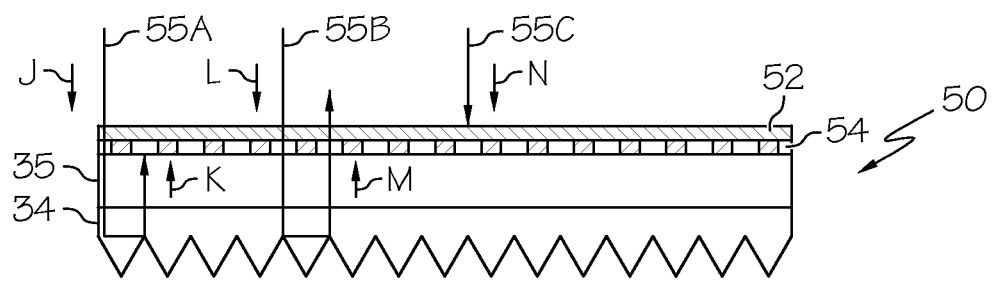
FIG. 3C depicts a retroreflective film having an imaged or printed pattern provided over the retroreflective film and a further laminate provided over the pattern to further alter the light.

In FIG. 3C, a printed retroreflected sheeting 50 is shown. The printed retroreflected sheeting 50 is comprised of the cover layer 35 and the microprism layer 34. In addition, the printed retroreflected sheeting 50 can be covered or laminated by an overlaminate material, or colored film overlay, 52. The overlaminate material 52 may filter and select a certain color wavelength to pass through the overlaminate material 52. In this embodiment, retroreflected light will now be filtered and only selected wavelengths, or colors, of light will be allowed to pass through the printed retroreflective sheeting 50. The printed retroreflected sheeting 50 may appear the same color as the overlaminate material 52.

The overlaminate material 52 may be temporarily adhered to the printed retroreflected sheeting 50. As shown in FIG. 3C, the overlaminate material 52 may be adhered with a removable pressure sensitive adhesive 54. By utilizing the removable pressure sensitive adhesive 54, the overlaminate material 52 may be completely removed from the printed retroreflected sheeting 50 in order to return the printed retroreflected sheeting 50 to its original properties. In addition, a permanent pressure sensitive adhesive may also be utilized instead of temporary adhering the overlaminate material 52.

The overlaminate material 52 can completely cover the surface of the printed retroreflected sheeting 50 or may only cover a portion of the printed retroreflected sheeting 50. Alternatively, the overlaminate material 52 may only be provided over the printed pattern depending on an end user's requirements. In addition to the embodiments described involving the overlaminate material 52 and the printed patter, other configurations and combinations may be utilized.

The overlaminate material 52 or ink layer 42 (FIG. 3B) may be applied to the retroreflected sheeting for additional reasons. For example, the overlaminate material 52 may be applied to the retroreflective sheeting of the present invention for ultraviolet light protection, weather protection, and to protect the retroreflective sheeting from grease, dirt and other environmental factors. For the foregoing reasons, the overlaminate material 52 may be translucent. A translucent ink layer may also be utilized for the same purpose.

In addition to the overlaminate material 52, an adhesive overlay may be utilized over the retroreflective sheeting. A release liner may also be adhered to the adhesive overlay in order to preserve an adhesiveness of the adhesive overlay. The utilization of the adhesive overlayer allows a different color or type of overlayer material onto the retroreflective sheeting.

Referring back to FIG. 3C, a fourth light path 55A enters through the overlaminate material 52, removable pressure sensitive adhesive 54 and the cover layer 35 as indicated by arrow J. The fourth light path 55A reflects off of the microprism layer 34 and is absorbed by the printed retroreflected sheet 50 as indicated by arrow K. In another embodiment, a fifth light path 55B enters through the overlaminate material 52, removable pressure sensitive adhesive 54 and the cover layer 35 as shown by arrow L, but the fifth light path 55B is retroreflected out of the printed retroreflected sheeting 50 as shown by arrow M. In yet another embodiment, a sixth light path 55C cannot enter through the overlaminate material 52 and removable pressure sensitive adhesive 54 as indicated by arrow N because the sixth light path 55C is not a selected wavelength that may pass through the overlaminate material 52.

Figure 4:
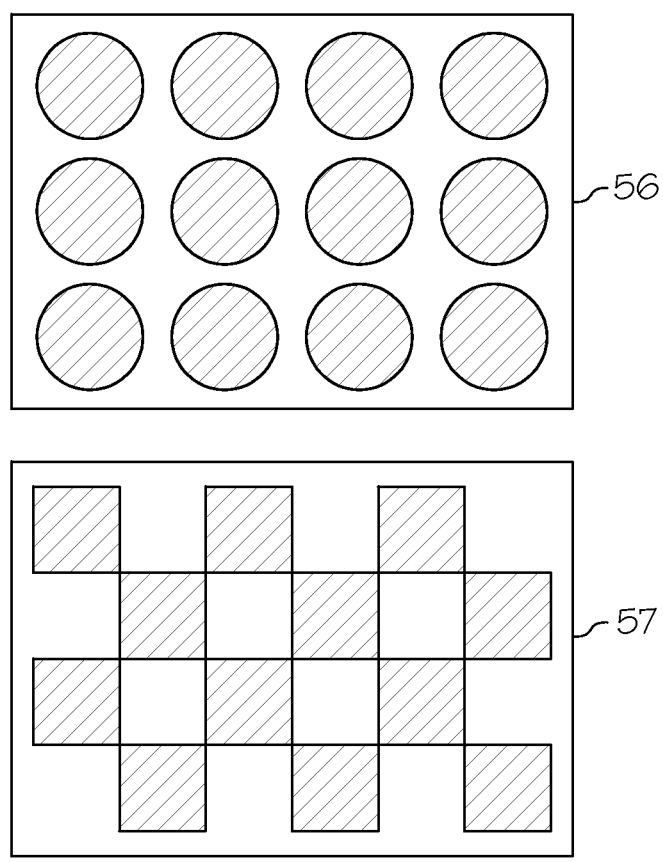
FIG. 4 illustrates a variation on a printed pattern.

FIG. 4 illustrates two examples of printed patterns that may be used on retroreflective sheeting. The printed patterns may be any variety of shape as shown by a dot matrix 56 or a checker-board of squares 57. Although only two embodiments are shown, the printed pattern may be any pattern of geometric elements, or shapes, including but not limited to circles, squares, rectangles, triangles, diamonds and wiregrids. However, the geometric elements must be uniform and symmetrical in nature. In addition, the printed pattern can be varied by changing sizes of the geometric elements. Also, the printed pattern could include certain indicia such as trademarks or names of a manufacturer or purchaser of the retroreflected sheeting.

Figure 5:
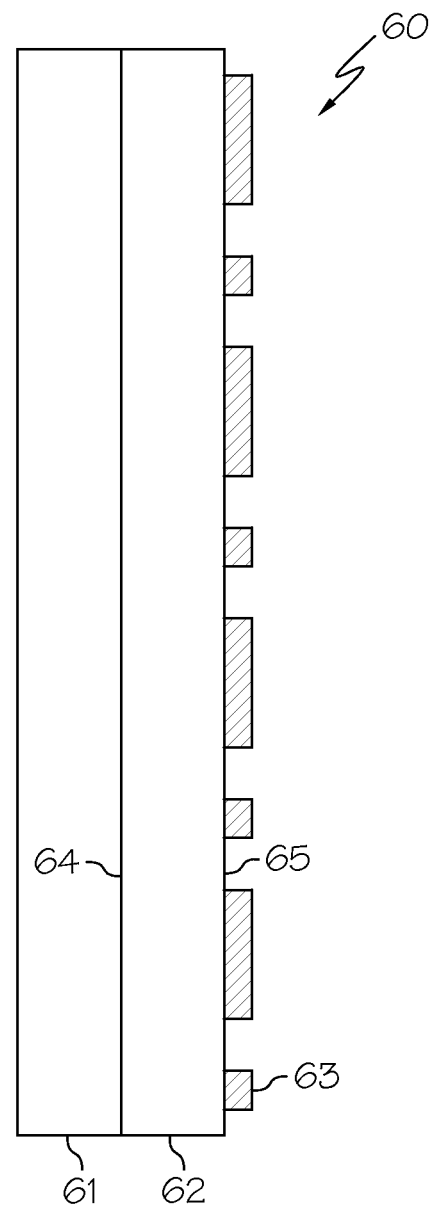
FIG. 5 provides a side view of a retroreflective sign.

With reference to FIG. 5, the retroreflective sheeting may be used to make a retroreflective sign 60 or safety device. A side view of the retroreflective sign 60 is shown. The retroreflective sign 60 is comprised of a sign blank 61, a substrate 62, and an ink pattern 63. The substrate 62 has a first surface 64 and a second surface 65. The sign blank 61 may be composed of a variety of materials including metal. The first surface 64 of the substrate 62 attaches to the sign blank 61, and the second surface 65 of the substrate 62 may have a plurality of retroreflective elements, which may include either beaded or prismatic sheeting components, as its ink pattern 63. The ink pattern 63 may be provided in an amount ranging from about 30% to about 100% of an area of the second surface.

Figure 6:
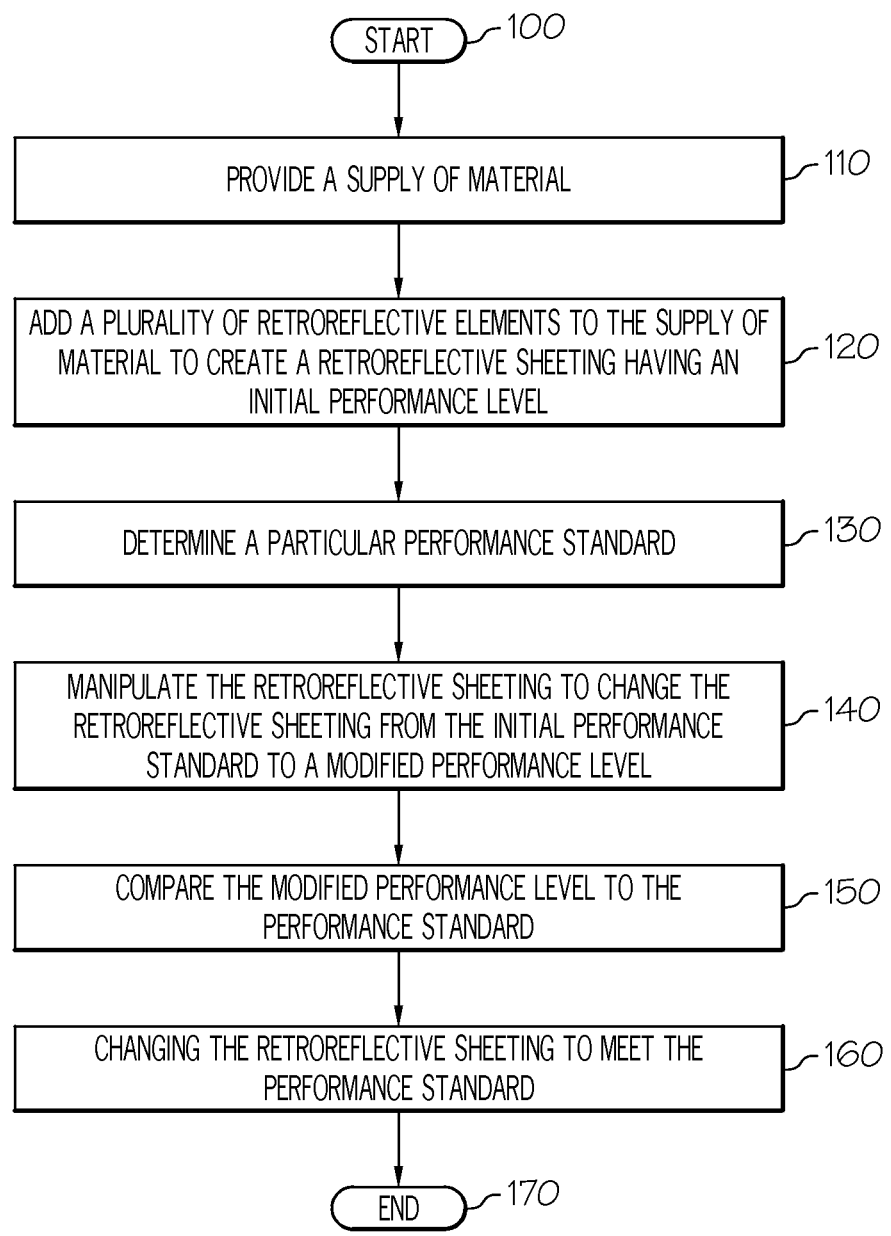
FIG. 6 provides a block diagram showing an exemplary method of practicing the present invention.

Turning now to FIG. 6, a block diagram is provided showing an exemplary process in practicing the presently described invention. The process starts at step 100, and a supply of material is provided at step 110. Next, at step 120, a plurality of retroreflective elements is added to the supply of material to create retroreflective sheeting having an initial performance level. These elements may include microprisms or microbeads, depending on a particular end use application.

At step 130, a particular performance standard is determined or selected for which the retroreflective sheeting is to be used. Then at step 140, the retroreflective sheeting is manipulated to change a performance of the retroreflective sheeting from the initial performance level to a modified performance level distinct from the initial performance level. The retroreflective sheeting may be manipulated through printing a pattern of dots or squares or any other method to change the performance.

At step 150, the modified performance level of the retroreflective sheeting is compared to the particular performance standard selected in step 130. If the modified performance standard of the retroreflective sheeting does not meet the particular performance standard that was selected in step 130, then the retroreflective sheeting may be further changed or modified at step 160, such as by further printing or use of overlays to ensure that the retroreflective sheeting now matches the particular performance standard that was sought. This step may be practiced multiple times until the retroreflective sheeting finally achieves the particular performance standard.

An exemplary system for practicing the invention includes a computer as well as a first data set and a second data set. The first and second data sets may be contained in the computer or may be located at different sites. The first data set may include a plurality of retroreflective performance standards, while the second data set may include printed patterns and/or overlays to be used in connection with manipulating the retroreflective performance standard of the retroreflective sheeting. The system further includes a supply of retroreflective sheeting, which may be provided as a collection of sheets or in roll format. The supply of retroreflective sheeting has an initial performance level.

The manufacturer or consumer may make a request for retroreflective sheeting, the request would include information on the particular performance standard. A manufacturing module is included to apply at least one pattern and/or overlay to the supply of retroreflective sheeting in order to change the initial performance level to the particular performance standard set forth in the request. A measurement module is used to confirm that the pattern and/or overlay has sufficiently adjusted the retroreflective sheeting to meet the particular performance standard set forth in the request.

The system and method provided focuses on an easy and economical method to manipulate retroreflective sheeting so as to be able to meet a relevant specification or standard. The main objective of this invention is to take an existing piece of sheeting and reduce the retroreflectivity in a controlled manner so that the specific intensity per unit area (SIA) value is equal to the particular performance standard. A manufacturer may reduce an inventory of retroreflective sheeting carried in stock by manipulating the retroreflective sheeting to meet an end user's requirements.

It will thus be seen according to the present invention a highly advantageous retroreflective sheeting and system and method of making has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A retroreflective sheet, comprising:
   a substrate having a first surface and a second surface with a plurality of retroreflective elements disposed on the first surface of the substrate to form the retroreflective sheet having an initial performance standard; and
   a printed pattern disposed on the second surface, the pattern provided in an amount ranging from 30% to about 100% of an area of the second surface to change a performance standard of the retroreflective sheet from the initial performance standard to a particular performance standard.

2. The retroreflective sheet of claim 1, wherein the plurality of retroreflective elements are microprisms or microbeads.

3. The retroreflective sheet of claim 1, wherein the retroreflective elements are selected from a group including triangles, hexagonal, squares, rectangles and combinations thereof.

4. The retroreflective sheet of claim 1, wherein the printed pattern is opaque.

5. The retroreflective sheet of claim 1, wherein an overlaminate material is provided over a portion of the printed pattern.

6. The retroreflective sheet of claim 5, wherein the overlaminate material may be positioned to selectively choose wavelengths of light that may pass through the overlaminate material.

7. The retroreflective sheet of claim 5, wherein the overlaminate material may be adhered to the retroreflective sheet either temporarily or permanently.

8. The retroreflective sheet of claim 1, wherein the printed pattern is printed in a checkerboard pattern or pattern of dots, triangles, or other geometric shapes.

9. The retroreflective sheet of claim 1, wherein the reflective sheet attaches to a sign blank and creates a retroreflective sign.

10. The retroreflective sheet of claim 1, wherein the printed pattern only partially covers the second surface.

11. A method for producing a retroreflective sheet, the method comprising the steps of:
    providing a supply of material, with the material having a first and second surface and a plurality of retroreflective elements provided on the first surface of the material to form retroreflective sheeting, the retroreflective sheeting having an initial retroreflective performance level; and
    manipulating the retroreflective sheeting to change the retroreflective sheeting from the initial retroreflective performance level to a modified retroreflective performance level different than the initial retroreflective performance level to match a particular performance standard.

12. The method of claim 11, wherein the step of manipulating includes printing a pattern on the second surface of the supply of material.

13. The method of claim 11, including a further step of comparing the manipulated retroreflective sheeting to the particular performance standard.

14. The method of claim 13, including a further step of changing the retroreflective sheeting after the step of comparing to meet the selected performance standard.

15. The method of claim 11, wherein the step of manipulating includes applying a colored laminate on the first surface of the supply of material.

16. The method of claim 12, wherein the pattern is a series of dots or a checkerboard pattern.

17. The method of claim 11, wherein the retroreflective sheeting is used on a road sign or a safety device.

18. A system for controlling retroreflectivity in retroreflective sheeting, the system comprising:
    a supply of retroreflective sheeting having an initial performance level;
    a first data set having a plurality of particular performance standards;
    a second data set containing a plurality of patterns and overlay combinations used for manipulating the supply of retroreflective sheeting to provide for the particular performance standards;
    a distribution request setting forth a particular retroreflective performance standard contained within the first data set;
    a manufacturing module for using at least one of the plurality of patterns and overlay combinations to change the initial performance level of the supply of retroreflective sheeting to the particular performance standards set forth in the distribution request; and a measurement tool for measuring the modified performance standard of the supply of retroreflective sheeting to the particular performance standards of the distribution request after utilizing the second data set to manipulate the supply of retroreflective sheeting.

19. The system of claim 18, wherein the supply of retroreflective sheeting has a substrate having a first surface and a second surface with a plurality of retroreflective elements disposed on the first surface of the substrate to form a retroreflective sheet having the initial performance level; and a printed pattern disposed on the second surface, the pattern provided in an amount ranging from 30% to about 100% of an area of the second surface to change the performance level of the retroreflective sheet from the first performance level to a particular performance standard.

20. The system of claim 18, wherein the first and second data sets are contained within a computer.

* * * * *